(12) United States Patent
Zhuang et al.

(10) Patent No.: US 11,023,400 B1
(45) Date of Patent: Jun. 1, 2021

(54) HIGH PERFORMANCE DMA TRANSFERS IN HOST BUS ADAPTERS

(71) Applicant: International Business Machines Corporation, Armonk, NY (US)

(72) Inventors: Jianwei Zhuang, San Jose, CA (US); Michael J. Palmer, Southampton (GB); Bitwoded Okbay, Gilroy, CA (US); Ailoan Tran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/746,970

(22) Filed: Jan. 20, 2020

(51) Int. Cl.
   *G06F 13/28* (2006.01)
   *G06F 13/16* (2006.01)

(52) U.S. Cl.
   CPC .......... *G06F 13/28* (2013.01); *G06F 13/1668* (2013.01)

(58) Field of Classification Search
   CPC .............................. G06F 13/28; G06F 13/1668
   See application file for complete search history.

(56) References Cited

U.S. PATENT DOCUMENTS

| | | | |
|---|---|---|---|
| 7,970,959 B2 | 6/2011 | Kuroki et al. | |
| 9,164,936 B2 | 10/2015 | Litch et al. | |
| 10,229,077 B2 | 3/2019 | Jan et al. | |
| 10,241,946 B2 | 3/2019 | Rochford et al. | |
| 10,360,164 B1 | 7/2019 | Julicher et al. | |
| 2014/0317333 A1 | 10/2014 | Dorst et al. | |
| 2015/0143031 A1* | 5/2015 | Lu | G06F 3/0613 |
| | | | 711/103 |
| 2015/0278131 A1* | 10/2015 | Hesse | G06F 13/28 |
| | | | 710/308 |
| 2016/0291867 A1* | 10/2016 | Olcay | G06F 13/28 |
| 2017/0371828 A1* | 12/2017 | Brewer | G06F 13/28 |
| 2018/0300614 A1 | 10/2018 | Ambardekar et al. | |
| 2019/0065325 A1* | 2/2019 | Anderson | G06F 3/0619 |

FOREIGN PATENT DOCUMENTS

| | | |
|---|---|---|
| WO | WO9722987 A1 | 6/1997 |
| WO | WO9934273 A2 | 7/1999 |

OTHER PUBLICATIONS

Intel Corp., "82378ZB System I/O (SIO) and 82379AB System I/O Apic (SIO.A)", available at: https://www.cpu-galaxy.at/CPU/Ram%20Rom%20Eprom/Other_Intel_chips/other_intel-Dateien/82379AB_Datasheet.pdf, Mar. 1996.

* cited by examiner

*Primary Examiner* — Nimesh G Patel
(74) *Attorney, Agent, or Firm* — Nelson and Nelson; Daniel P. Nelson

(57) ABSTRACT

A method for improving performance of a direct memory access (DMA) transfer is disclosed. The method generates a descriptor that describes parameters of a DMA transfer to be performed by a DMA engine, such as a DMA engine within a host bus adapter of a data storage system. The method provides, in the descriptor, a field that describes an operation to be performed by the DMA engine. The field has as options an echo read operation, a dual write operation, a loop DDs operation, and a normal DMA transfer operation. The method provides the descriptor to the DMA engine. The DMA engine extracts the operation from the field and performs the operation. This operation may, in certain embodiments, move data through a host bus adapter of a data storage system. A corresponding system and computer program product are also disclosed.

20 Claims, 6 Drawing Sheets

| DMA Descriptor 402 ||
|---|---|
| Word | Field |
| 0 | Control Field |
| 1 | Control Extension Field |
| 2, 3 | Source Address |
| 4, 5 | Descriptor Count Involved in Dual Write and Loop DDs |
| 6, 7 | Destination Address |
| 8, 9 | Number of DMA Loops in Loop DDs |
| 10, 11 | Next Descriptor Address |
| 12, 13 | Second Destination Address for Dual Write or Loop Address Pointer List |
| 14, 15 | Descriptor LRC |
| 16, 17 | Completion Status |

Fig. 6

HIGH PERFORMANCE DMA TRANSFERS IN HOST BUS ADAPTERS

BACKGROUND

Field of the Invention

This invention relates to systems and methods for improving performance of host bus adapters in data storage systems.

Background of the Invention

In enterprise storage systems such as the IBM DS8000™ enterprise storage system, a storage controller may enable one or more host systems (e.g., open system and/or mainframe servers running operating systems such z/OS, zVM, or the like) to access data in one or more storage drives. In certain implementations, the storage controller includes one or more servers. Multiple servers may ensure that data is always available to connected host systems. When one server fails, the other server may pick up the I/O load of the failed server to ensure that I/O is able to continue between the host systems and backend storage volumes, which may be implemented on storage devices (e.g. hard disk drives, solid state drives, etc.) within the enterprise storage system. This process may be referred to as a "failover." During normal operation (when both servers are operational), the servers may manage I/O to different logical subsystems (LSSs) within the enterprise storage system. For example, in certain configurations, a first server may handle I/O to even LSSs, while a second server may handle I/O to odd LSSs.

Each server in the IBM DS8000™ enterprise storage system may include multiple host bus adapters (HBAs) to provide connectivity between external host systems and backend storage drives. These host bus adapters may relieve the storage controller of both data storage and retrieval tasks, and in so doing improve the performance of the storage controller. Because all I/O between host systems and backend storage drives typically passes through the host bus adapters, the efficiency of the host bus adapters is critical to the performance (e.g., data throughput) of the storage controller. It follows that any improvements to the performance (e.g., data throughput) of the host bus adapters may improve the performance of the storage controller.

In view of the foregoing, what are needed are systems and methods to improve the performance of host bus adapters in storage systems such as the IBM DS8000™ enterprise storage system.

SUMMARY

The invention has been developed in response to the present state of the art and, in particular, in response to the problems and needs in the art that have not yet been fully solved by currently available systems and methods. Accordingly, embodiments of the invention have been developed to improve the performance of host bus adapters in data storage systems. The features and advantages of the invention will become more fully apparent from the following description and appended claims, or may be learned by practice of the invention as set forth hereinafter.

Consistent with the foregoing, a method for improving performance of a direct memory access (DMA) transfer is disclosed. The method generates a descriptor that describes parameters of a DMA transfer to be performed by a DMA engine, such as a DMA engine within a host bus adapter of a data storage system. The method provides, in the descriptor, a field that describes an operation to be performed by the DMA engine. The field has as options an echo read operation, a dual write operation, a loop DDs operation, and a normal DMA transfer operation. The method provides the descriptor to the DMA engine. The DMA engine extracts the operation from the field and performs the operation. This operation may, in certain embodiments, move data through a host bus adapter of a data storage system.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 6 is a high-level block diagram showing a specific embodiment of a DMA descriptor in accordance with the invention.

DETAILED DESCRIPTION

Figure 1:
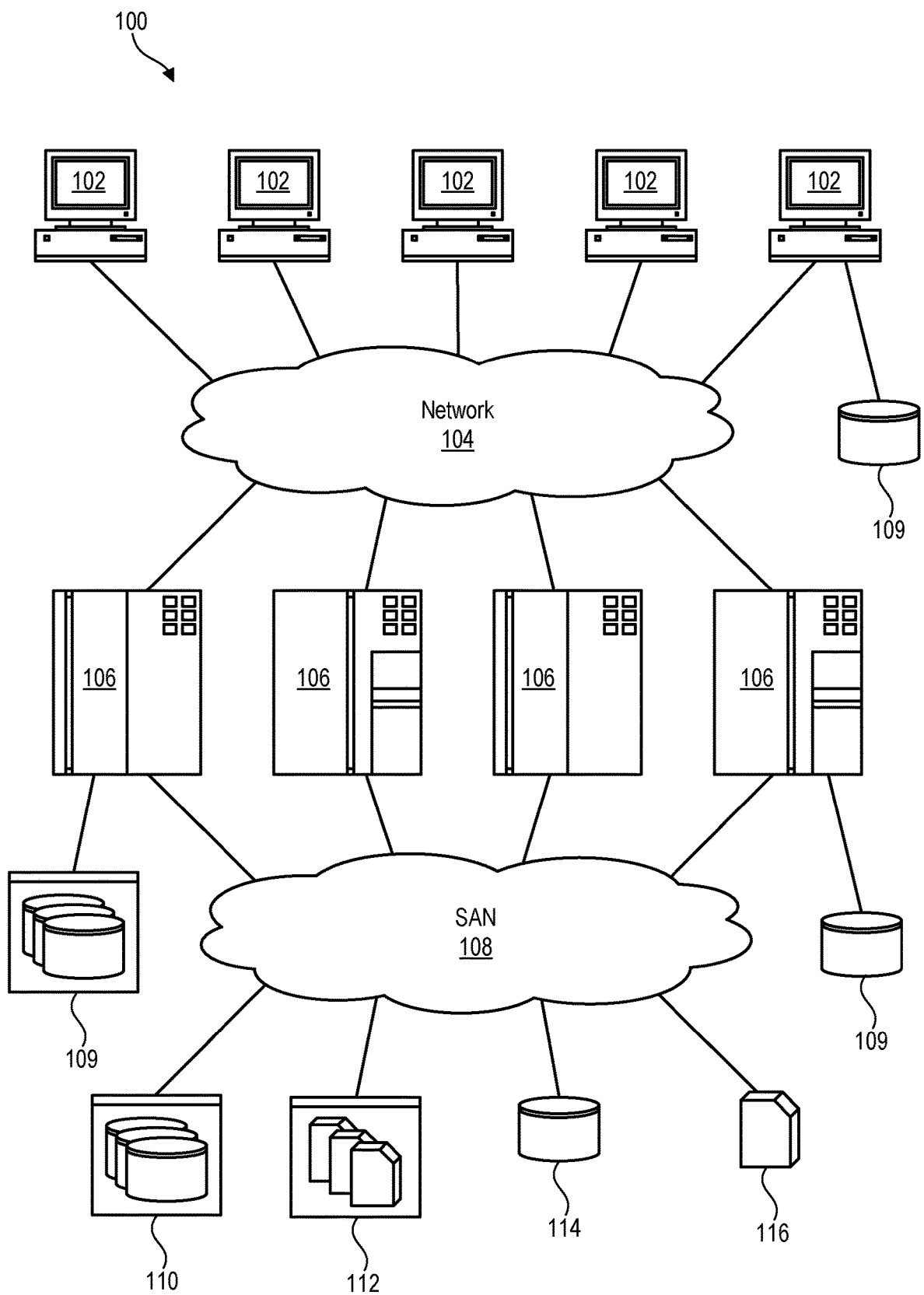
FIG. 1 is a high-level block diagram showing an example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 109 (e.g., arrays of hard-storage drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard or protocol such as Fibre Channel (FC) or iSCSI.

Figure 2:
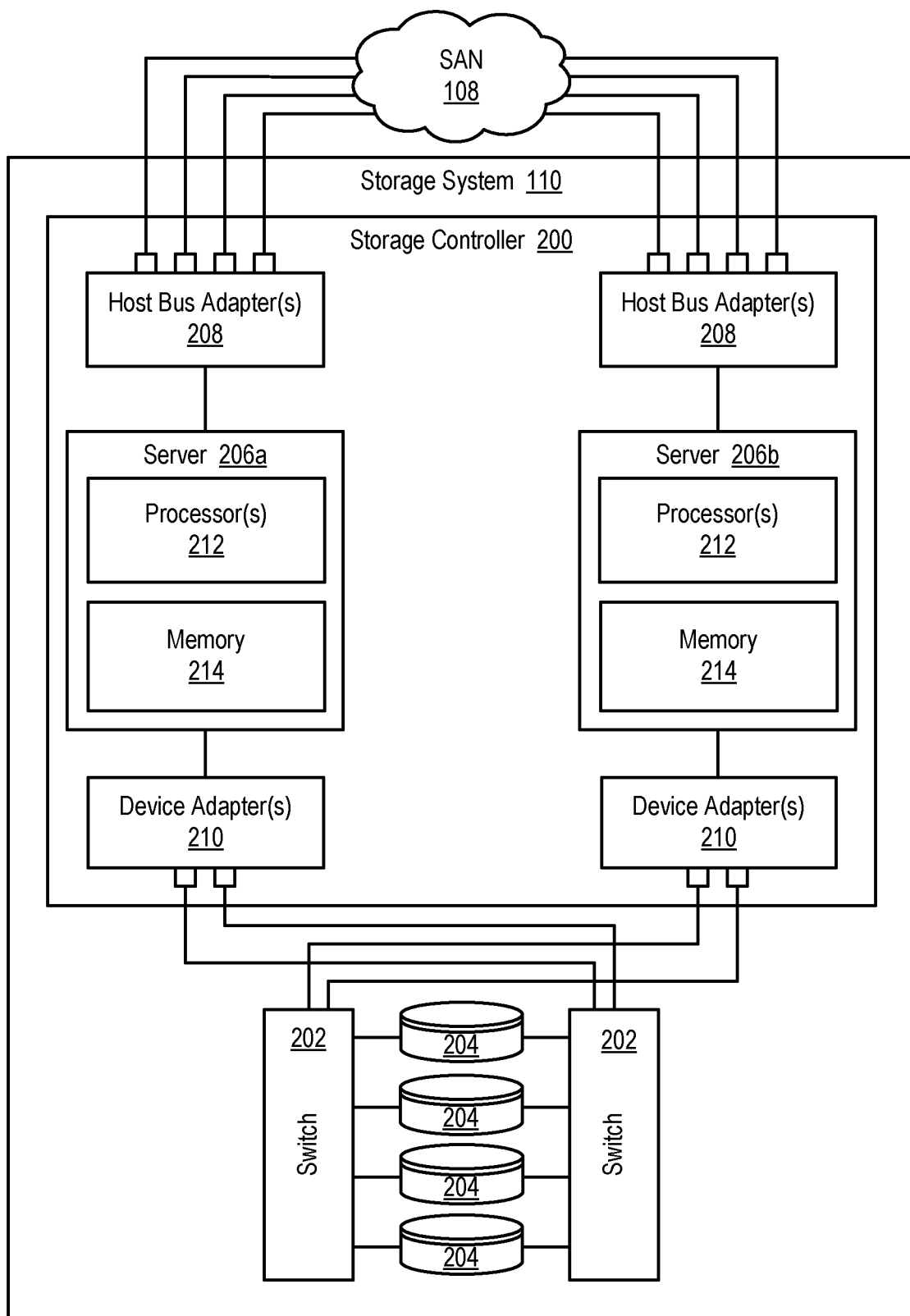
FIG. 2 is a high-level block diagram showing one embodiment of a storage system for use in the network environment of FIG. 1.

Referring to FIG. 2, one example of a storage system 110 containing an array of hard-disk drives 204 and/or solid-state drives 204 is illustrated. The storage system 110 is illustrated to show an exemplary environment in which systems and methods in accordance with the invention may be implemented. As shown, the storage system 110 includes a storage controller 200, one or more switches 202, and one or more storage drives 204, such as hard-disk drives 204 and/or solid-state drives 204 (e.g., flash-memory-based drives 204). The storage controller 200 may enable one or more host systems 106 (e.g., open system and/or mainframe servers 106 running operating systems such z/OS, zVM, or the like) to access data in the one or more storage drives 204.

In selected embodiments, the storage controller 200 includes one or more servers 206a, 206b. The storage controller 200 may also include host bus adapters 208 and device adapters 210 to connect the storage controller 200 to host devices 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes 322 implemented on the storage drives 204.

One example of a storage system 110 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
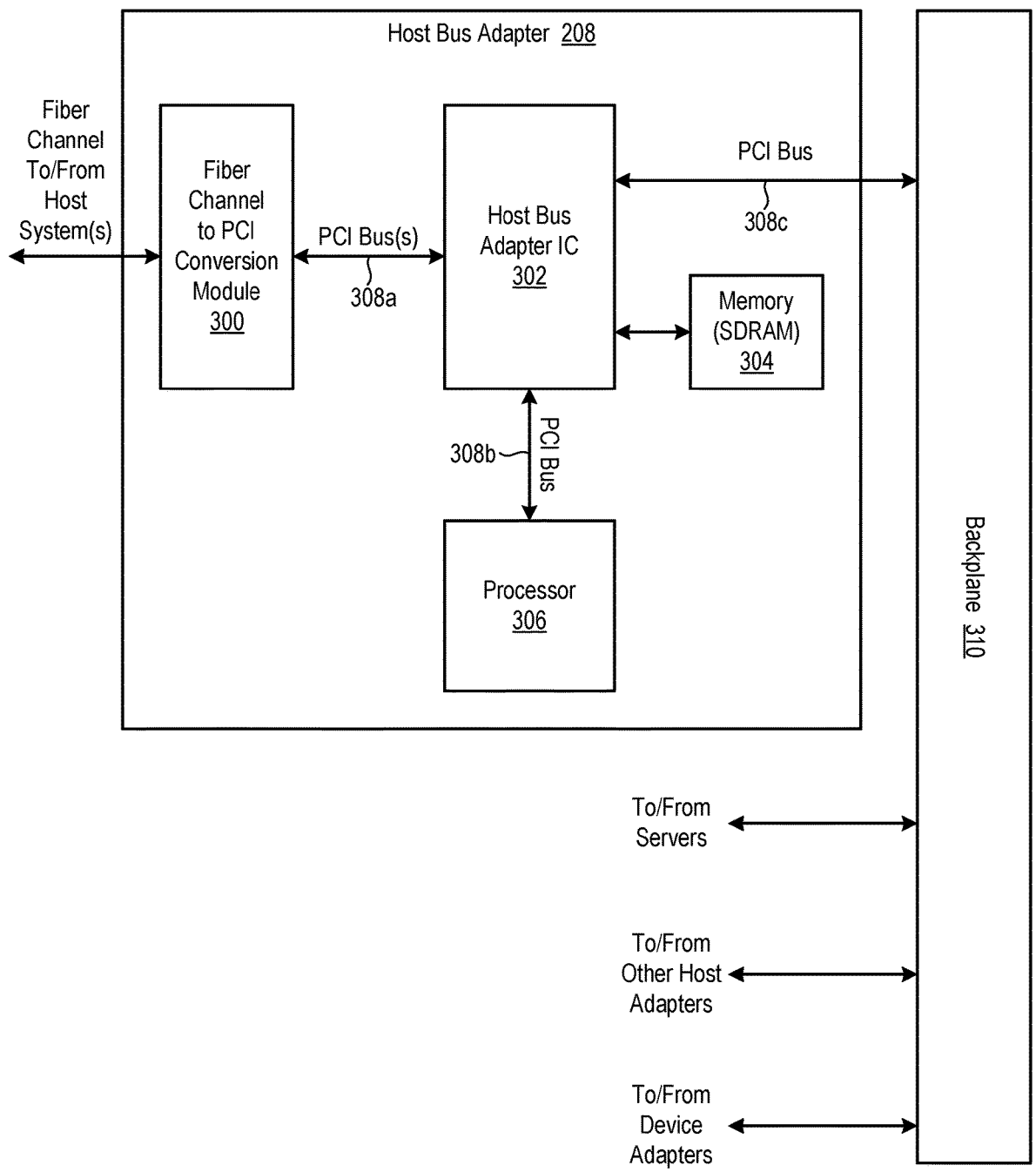
FIG. 3 is a high-level block diagram showing various internal components within a host bus adapter.

Referring to FIG. 3, as previously mentioned, each server 206 in a storage system 110 such as the IBM DS8000™ enterprise storage system may include one or more host bus adapters (HBAs) 208 to provide connectivity between external host systems 106 and/or backend storage drives 204. These host bus adapters 208 may relieve the storage controller 200 of both data storage and retrieval tasks, and in so doing improve the performance of the storage controller 200. Because all I/O between host systems 106 and backend storage drives 204 may pass through the host bus adapters 208, the efficiency of the host bus adapters 208 may be critical to the performance (e.g., data throughput) of the storage controller 200. It follows that any improvements to the performance (e.g., data throughput) of the host bus adapters 208 may improve the performance of the storage controller 200. Thus, systems and methods are needed to improve the performance of host bus adapters 208 in storage systems 110 such as the IBM DS8000™ enterprise storage system.

FIG. 3 is a high-level block diagram showing various internal components that may be included within a host bus adapter 208 in accordance with the invention. Such a host bus adapter 208 may, in certain embodiments, communicate with host systems 106 using a networking technology such as Fibre Channel. When read or write requests are received by the host bus adapter 208 over Fibre Channel, a conversion module 300 may convert the Fibre Channel signals to a protocol suitable for transmission over a bus 308a, such as a PCI or PCIe bus 308a. These converted signals may be received by a host bus adapter integrated circuit (IC) 302. The host bus adapter IC 302 may contain various components, such as a memory controller, to access a memory 304 (e.g., SDRAM memory 304) within the host bus adapter 208. In certain embodiments, the host bus adapter IC 302 is implemented as an application-specific integrated circuit (ASIC) customized for the host bus adapter 208. The functionality of the host bus adapter IC 302, as well as its internal components, will be discussed in more detail in association with FIGS. 4 and 5.

As further shown in FIG. 3, the host bus adapter IC 302 may interface with a processor 306 by way of a bus 308b, such as a PCI or PCIe bus 308b. In certain embodiments, the operation of the host bus adapter 208 may be managed by microcode running on the processor 306. For example, the microcode may configure chips or components on the host bus adapter 208, such as the host bus adapter IC 302, at the time the host bus adapter 208 is initialized. The microcode may also initialize direct-memory-access (DMA) descriptors in memory and start DMA operations that are then executed by the host bus adapter IC 302.

As shown in FIG. 3, the host bus adapter IC 302 may interface with a backplane 310 in the storage controller 200 by way of a bus 308c, such as a PCI or PCIe bus 308c. This backplane 310 may provide means for transferring data and signals between the host bus adapter 208, servers 206, device adapters 210, and other host bus adapters 208 within the storage controller 200.

Figure 4:
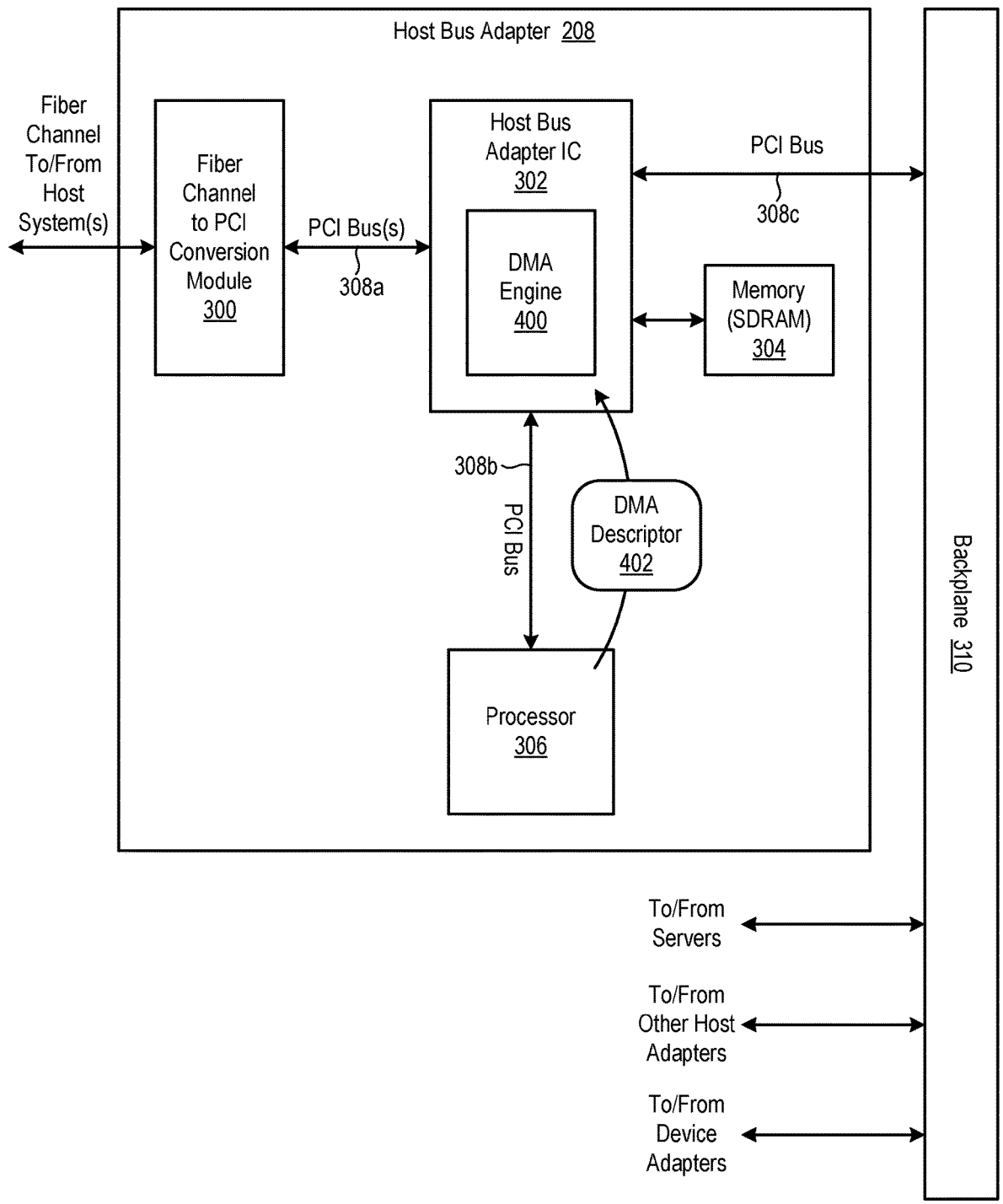
FIG. 4 is a high-level block diagram showing a DMA engine and DMA descriptor within the host bus adapter.

Referring to FIG. 4, in certain embodiments, the host bus adapter IC 302 may include a DMA engine 400 to directly access data within the memory 304 and transfer data through the host bus adapter 208 without overly involving the processor 306. For example, after receiving initial instructions (i.e., one or more DMA descriptors 402) from the processor 306, the DMA engine 400 may directly transfer data from the host bus adapter 208 to external components such as host systems 106, servers 206, device adapters 210, and other host bus adapters 208 in accordance with the instructions. This may free the processor 306 to do other work while the data transfer is occurring.

In certain cases, various types of complex DMA transfer operations may require multiple DMA descriptors 402 as well as require a DMA engine 400 to run multiple times. These complex DMA transfer operations may include, for example, an "echo read" operation, "dual write" operation, and "loop DDs" operation (where "DDs" is an abbreviation for DMA descriptors 402). An "echo read" is executed after a write DMA to read a last byte of data written to a destination address. Due to the ordering of writes and reads, if the last byte is successfully returned by the "echo read," then all preceding bytes that were part of the DMA transfer may be assumed to have been written successfully. Therefore, upon completing the "echo read" (one byte of data is returned), the DMA engine 400 and/or processor 306 may determine that the write data transfer is complete and has reached its destination.

A "dual write" operation, by contrast, may be used to transfer data from a source address to multiple destination addresses. For example, in the IBM DS8000™ environment, when a write is stored in cache of a first server 206a, the write may also be stored in non-volatile storage (NVS) of the opposite server 206b so that the write can be recovered by the opposite server 206b in the event the first server 206a fails. A "dual write" operation may, in certain embodiments, be used to store write data in both cache of the first server 206a and non-volatile storage (NVS) of the opposite server 206b.

A "loop DDs" operation, by contrast, may gather data from multiple source locations and write the data to a single or smaller number of destination locations. A "loop DDs" operation may have one of two formats: 1) a first format where source locations have different transfer counts, and 2) a second format where all source locations have a common transfer count. The "loop DDs" operation may reference a loop address pointer list, stored in memory 304, that contains a list of source addresses (and transfer counts if applied) from which the "loop DDs" operation gathers data. This data may then be written to a single or smaller number of destination addresses.

Each of the complex DMA operations described above (i.e., "echo read" operation, "dual write" operation, and "loop DDs" operations) may require additional DMA descriptors 402 and runs of a DMA engine 400 to complete. This, in turn, causes additional turn-around time, lower performance, and overhead on a processor 306. Thus, systems and methods are needed to execute complex DMA operations such as those described above in a more efficient manner and with less processor overhead.

Figure 5:
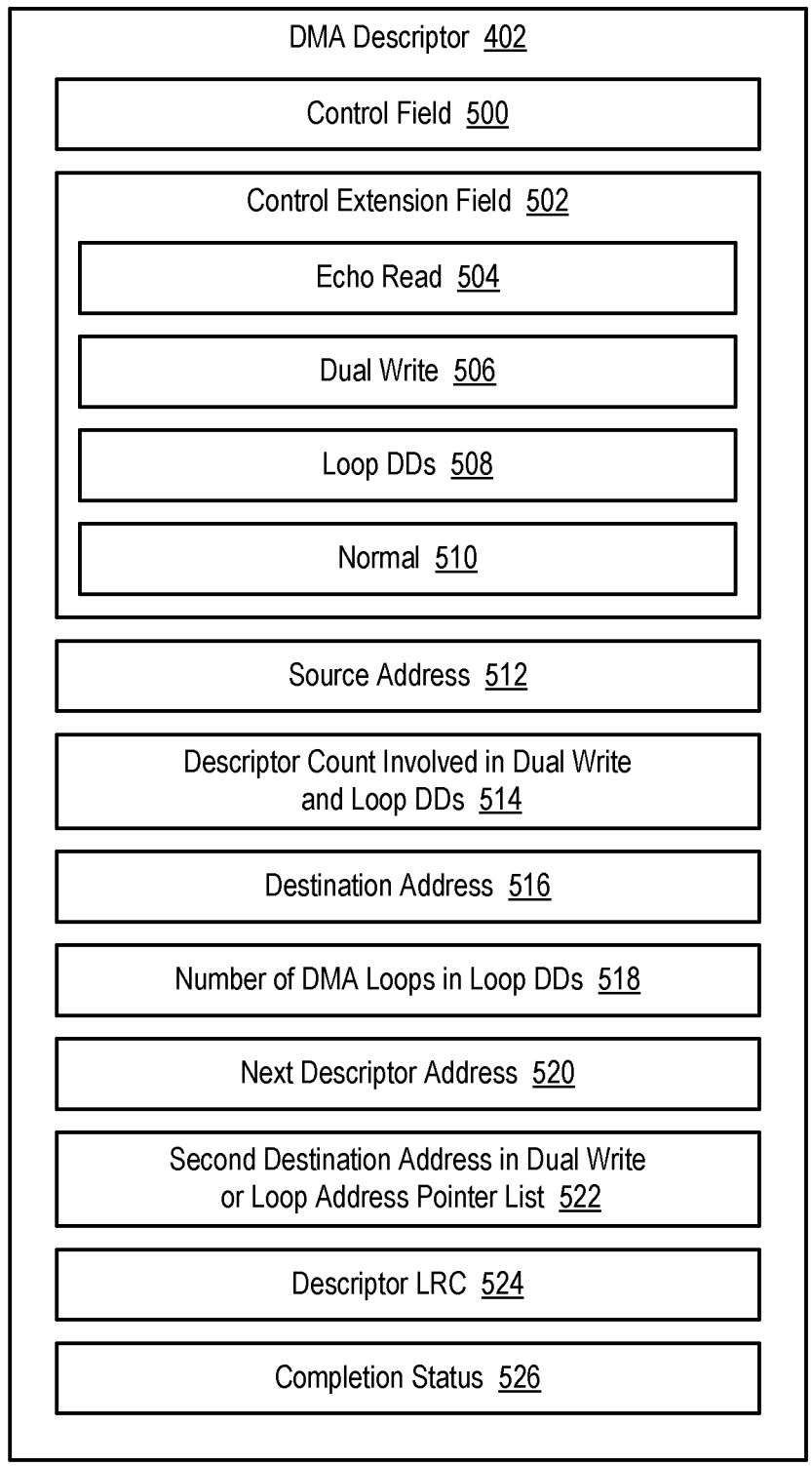
FIG. 5 is a high-level block diagram showing various internal fields within a DMA descriptor in accordance with the invention.

Referring to FIG. 5, in certain embodiments, a DMA descriptor 402 may be redesigned to enable the above-described complex DMA operations to be executed with fewer DMA descriptors 402 and/or runs of a DMA engine 400. The new DMA descriptor 402 may retain a block structure and size that is similar to previous DMA descriptors 402 but be configured to implement complex DMA operations such as the "echo read," "dual write," and "loop DDs" operations described above.

As shown in FIG. 5, in certain embodiments, a DMA descriptor 402 in accordance with the invention may include one or more of a control field 500, control extension field 502, source address 512, descriptor count 514, destination address 516, number 518 of DMA loops in a "loop DDs" operation, next descriptor address 520, second destination address 522 in "dual write" or "loop DDs" operations, descriptor LRC 524 (i.e., DMA descriptor 402 integrity check), and completion status 526.

The control extension field 502 may contain an operation code that indicates a complex DMA operation to be performed by a DMA engine 400. For example, the control extension field 502 may contain an operation code that designates one of an "echo read" operation 504, "dual write" operation 506, "loop DDs" operation 508, and normal operation 510 (i.e., an operation that is not an "echo read" operation, "dual write" operation, or "loop DDs" operation).

When the operation code in the control extension field 502 is set to "echo read," the DMA engine 400 moves data located at the source address 512 to the destination address 516. This is followed by a read (e.g., a one-byte read) of the last data element (e.g., byte) of the data that was written to the destination address 516 with the count range of the data. The DMA engine 400 then reports a completion status 526 of the DMA transfer (indicating whether the DMA transfer was successful or unsuccessful based on whether the read byte is returned without hardware errors). This ensures that the full count of write data successfully reached its destination.

When the operation code in the control extension field 502 is set to "dual write," the DMA engine 400 performs a "dual write" operation. This will move data located at the source address 512 to the destination address 516 and to the second destination address 522 indicated in the DMA descriptor 402. In this way, multiple copies of the data may be stored at different locations.

When the operation code in the control extension field 502 is set to "loop DDs," the DMA engine 400 performs a "loop DDs" operation. This will gather data stored at different locations for writing to a single location. To accomplish this, the DMA engine 400 may access addresses in a loop address pointer list 522 referenced in the DMA descriptor 402. This loop address pointer list 522 may be stored in memory 304 of the host bus adapter 208. The data that is gathered from the addresses in the loop address pointer list 522 is written to the destination address 516. The DMA descriptor 402 may also store a number 518 of DMA loops in the "loop DDs" operation (i.e., a number of locations from which data will be gathered) as well as a next descriptor address 520 that links the DMA descriptor 402 to a next DMA descriptor 402 used in the "loop DDs" operation. A descriptor count 514 indicates a number of DMA descriptors 402 that are involved in the "loop DDs" operation.

When the operation code in the control extension field 502 is set to "normal," the DMA engine 400 operates in normal mode (i.e., a mode that is not tailored to an "echo read" operation, "dual write" operation, or "loop DDs" operation). In this mode, when performing "echo read" operations, "dual write" operations, and/or "loop DDs" operations, the DMA engine 400 requires additional DMA descriptors 402, turn around time, and runs of the DMA engine 400 as is typical with conventional operation.

FIG. 6 is a high-level block diagram showing a specific embodiment of a DMA descriptor 402 in accordance with the invention. The embodiment is simply provided by way of example and not limitation. The illustrated embodiment shows a DMA descriptor 402 made up of eighteen words, where each word comprises thirty-two bits. As shown, word 0 is used to store the control field 500 and word 1 is used to store the control extension field 502. Within the control extension field 502, the operation code "1000" may be used to implement an "echo read" operation, the operation code "1001" may be used to implement a "dual write" operation, the operation code "1010" or "1011" may be used to implement a "loop DDs" operation, and all other operation codes may be used to implement a "normal" operation. These operation codes are simply examples and are not intended to be limiting.

As further shown in FIG. 6, words 2 and 3 may be used to store a source address 512, words 4 and 5 may be used to store a descriptor count 514 involved in "dual write" or "loop DDs" operations, and words 6 and 7 may be used to store a destination address 516. Words 8 and 9 may be used to store a number 518 of DMA loops in a "loop DDs" operation, words 10 and 11 may be used to store a next descriptor address 520, and words 12 and 13 may be used to store a second destination address 522 for a "dual write" operation, or an address 522 of a loop address pointer list for a "loop DDs" operation. Words 14 and 15 may be used to store a descriptor LRC 524 to verify the integrity of the DMA descriptor 402, and words 16 and 17 may be used to store a completion status 526 for an operating mode indicated in the control extension field 502.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for improving performance of a direct memory access (DMA) transfer, the method comprising:
   generating a descriptor describing parameters of a DMA transfer to be performed by a DMA engine;
   providing, in the descriptor, a field that describes an operation to be performed by the DMA engine, the field having as options an echo read operation, a dual write operation, a loop DDs operation, and a normal DMA transfer operation;
   providing the descriptor to the DMA engine;
   extracting, by the DMA engine, the operation from the field; and
   performing the operation by the DMA engine.

2. The method of claim 1, wherein the DMA engine is included within a host bus adapter of a data storage system.

3. The method of claim 1, wherein the DMA transfer moves data through a host bus adapter of a data storage system.

4. The method of claim 1, further comprising saving, by the DMA engine in the descriptor, a completion status associated with the operation after the operation is complete.

5. The method of claim 1, wherein the descriptor further stores a source address from which data is read by the DMA engine.

6. The method of claim 1, wherein the descriptor further stores a destination address to which data is written by the DMA engine.

7. The method of claim 1, wherein the descriptor further stores a count of descriptors used in the DMA transfer.

8. A computer program product for improving performance of a direct memory access (DMA) transfer, the computer program product comprising a computer-readable medium having computer-usable program code embodied therein, the computer-usable program code configured to perform the following when executed by at least one processor:
   generate a descriptor describing parameters of a DMA transfer to be performed by a DMA engine;
   provide, in the descriptor, a field that describes an operation to be performed by the DMA engine, the field having as options an echo read operation, a dual write operation, a loop DDs operation, and a normal DMA transfer operation; and
   provide the descriptor to the DMA engine in order to perform the operation.

9. The computer program product of claim 8, wherein the DMA engine is included within a host bus adapter of a data storage system.

10. The computer program product of claim 8, wherein the DMA transfer moves data through a host bus adapter of a data storage system.

11. The computer program product of claim 8, wherein the computer-usable program code is further configured to save, in the descriptor, a completion status associated with the operation after the operation is complete.

12. The computer program product of claim 8, wherein the descriptor further stores a source address from which data is read by the DMA engine.

13. The computer program product of claim 8, wherein the descriptor further stores a destination address to which data is written by the DMA engine.

14. The computer program product of claim 8, wherein the descriptor further stores a count of descriptors used in the DMA transfer.

15. A system for improving performance of a direct memory access (DMA) transfer, the system comprising:
   a storage controller;
   a host bus adapter for facilitating data flow through the storage controller, the host bus adapter configured to:
      generate a descriptor describing parameters of a DMA transfer to be performed by a DMA engine;
      provide, in the descriptor, a field that describes an operation to be performed by the DMA engine, the field having as options an echo read operation, a dual write operation, a loop DDs operation, and a normal DMA transfer operation; and
      provide the descriptor to the DMA engine in order to perform the operation.

16. The system of claim 15, wherein the DMA engine is included within the host bus adapter.

17. The system of claim 15, wherein the DMA transfer moves data through the host bus adapter.

18. The system of claim 15, wherein the DMA engine is further configured to save, in the descriptor, a completion status associated with the operation after the operation is complete.

19. The system of claim 15, wherein the descriptor further stores a source address from which data is read by the DMA engine.

20. The system of claim 15, wherein the descriptor further stores a destination address to which data is written by the DMA engine.

* * * * *